Jan. 28, 1930.  J. A. DIENNER  1,744,953
METHOD OF AND MEANS FOR PRIMING ENGINES
Filed Oct. 11, 1923  2 Sheets-Sheet 2
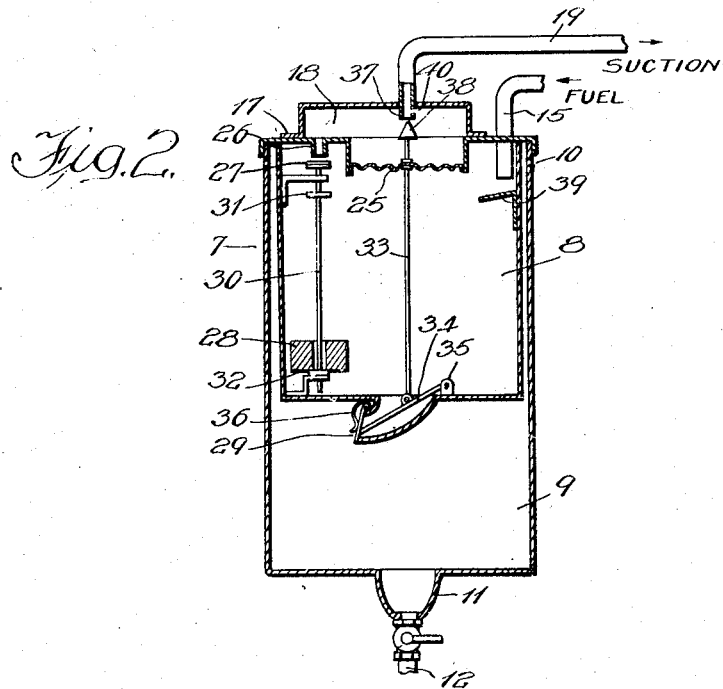
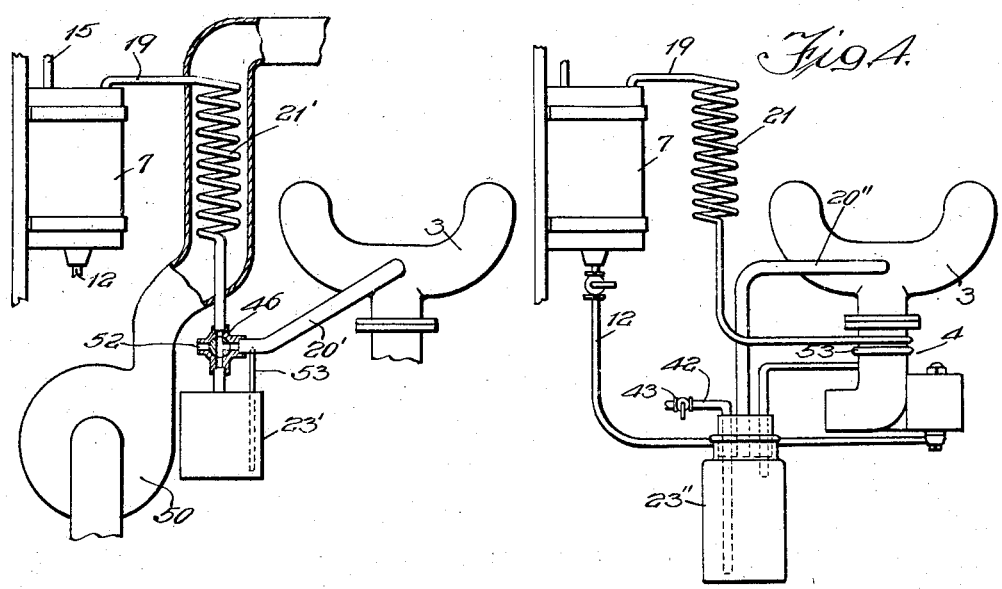

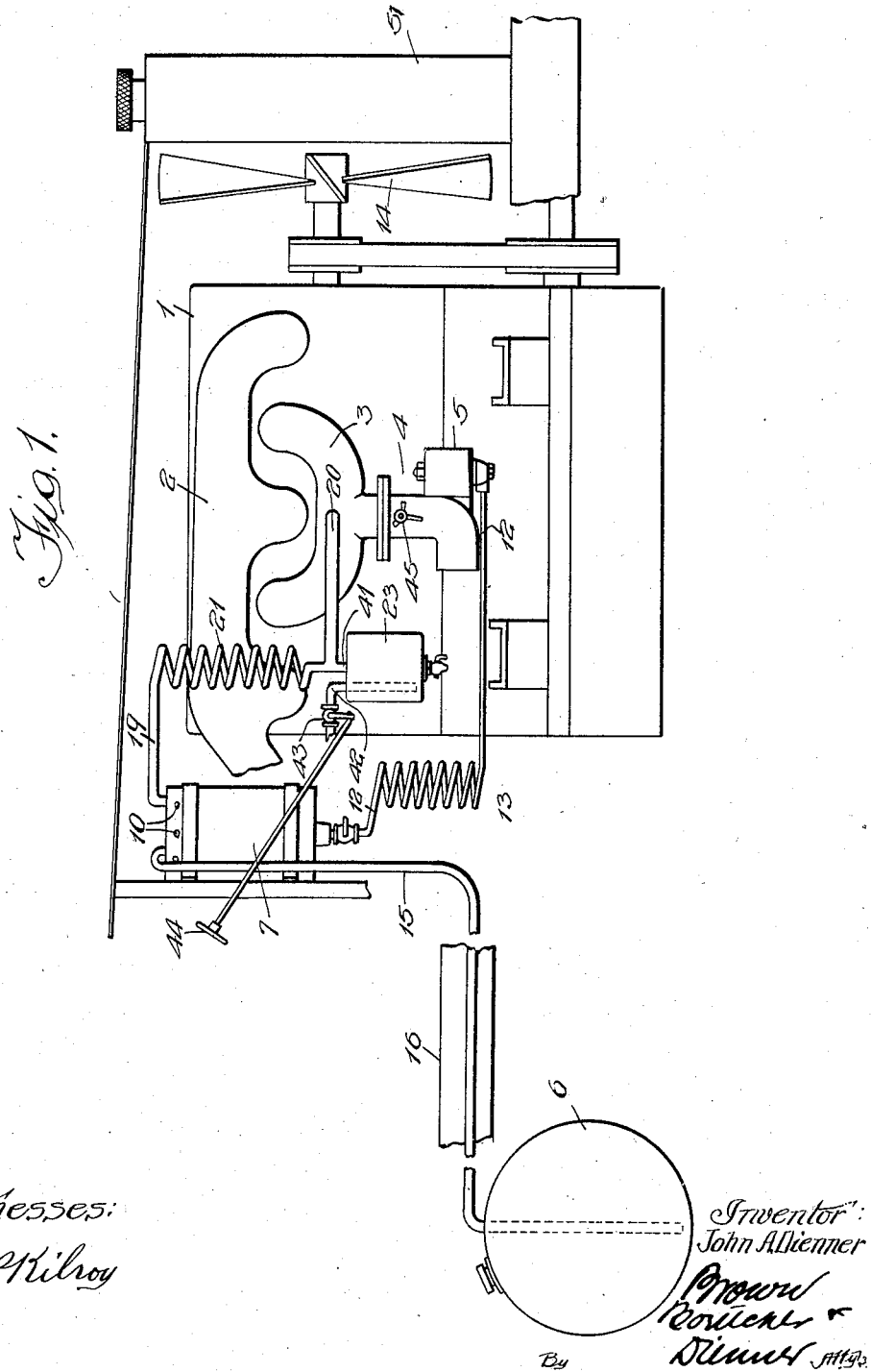

Patented Jan. 28, 1930

1,744,953

UNITED STATES PATENT OFFICE

JOHN A. DIENNER, OF CHICAGO, ILLINOIS

METHOD AND MEANS FOR PRIMING ENGINES

Application filed October 11, 1923. Serial No. 667,824.

My invention relates to internal combustion engines and more particularly to a method of and means for starting internal combustion engines.

It is well known that with present day fuels, the starting of an internal combustion engine cold is often difficult. If a charge of low boiling point fuel could be provided for each start, the matter of starting the engine could be rendered easy.

According to my invention, I provide apparatus which will secure or prepare a suitable starting charge of low boiling point liquid fuel by the normal running of the engine. In other words, the starting device of my invention generates or prepares a suitable starting fuel as a by-product of the running of the engine.

Since it would otherwise be necessary to provide two separate supplies of fuel of different character, I have provided means for securing a suitable supply of highly volatile fuel for starting purposes by distilling off the lighter fractions from the regular fuel supply.

This action of taking off the lighter ends is carried on automatically in the process of taking the regular fuel through the vacuum feeding system.

When it is desired to start the engine, the auxiliary carburetor is connected to the intake manifold for discharging a mixture of the volatile fuel and air into the intake passageway of the engine, and, at the same time, the vacuum tank connection is rendered relatively ineffective.

By this mode of operation, it is possible to employ as the regular fuel for running the engine, much heavier liquid fuel than is heretofore usable, the only qualification being that the liquid fuel contain some light ends which may be distilled off and trapped.

If the condenser or still is of the air cooled type, the condenser will be the more effective in the winter time when more call is had for the lighter constituent for starting the engine.

The condenser may be refrigerated or cooled by a current of air as from the fan of the engine, or by a current of water, as that from the radiator to the water jacket, or by the cooling effect of the evaporation of the gasoline or other liquid fuel in the usual carburetor, that is, cooling by vaporization, or by any other means.

In order to acquaint those skilled in the art with the manner of constructing and operating one form of my invention, I shall now describe a specific embodiment of the same in connection with the accompanying drawings in which, Fig. 1 is a diagram of a system embodying my invention;

Fig. 2 is a vertical central section through the improved form of vacuum tank which I employ;

Fig. 3 is a diagram of a modified system employing the cooling water for cooling the condenser; and Fig. 4 is a diagram of a modification in which the cooling of a part of the condenser is caused by the vaporization of the gasoline in the usual carburetor.

The internal combustion engine 1 has the usual exhaust manifold 2, and intake manifold 3 which is suitably connected to a carburetor 4, all as well known in the art. The carburetor 4 is provided with a suitable float chamber 5 for maintaining a substantially constant level, and this float chamber is fed with liquid fuel from the main tank 6 by means of the vacuum feed tank 7, which has suitable connections, as will now be described.

The tank 7, which is shown in section in Fig. 2, comprises an upper pumping chamber 8 and a lower reservoir chamber 9.

The reservoir chamber 9 communicates with atmosphere through the vent openings 10 at its upper end, and it has a liquid fuel discharge connection 11 which connects by way of the pipe 12 to the float chamber 5 of the carburetor. The discharge pipe 12 which conveys the liquid fuel by gravity from the reservoir 9 to the float chamber 5 is formed into a cooling coil 13 which is adapted to be cooled by the blast of air from the cooling fan 14 of the engine to the temperature of the air in the hood, or substantially so. The tank 7 is connected to the main fuel supply tank 6 by means of a pipe 15, which pipe 15 for a portion of its length is adapted to be heated as by being put against the exhaust pipe 16 of the engine. The heating of the liquid fuel is not necessary to the practice of my invention, but it may be employed to assist the operation of the same. Instead of heating the liquid fuel in its passage from the main tank 6 to the vacuum tank 7, I may heat the liquid fuel after it is discharged into said tank 7 either in the compartment 8, or in the reservoir 9, but this is optional within my invention. If the incoming fuel is not heated in either the pipe 15 or the tank 7, the cooling coil 13 need not be employed, since the function of this cooling coil 13 is to cool down the liquid so that it will not have a tendency to boil or give off vapors in the float chamber 5 of the carburetor 4.

The upper compartment 8 of the tank 7 has a head member 17 forming a suction chamber 18 which is at all times connected through the pipe 19 and through pipe 20 to the intake manifold 3. As shown in Fig. 1, an air cooled condenser 21 is inserted between the pipe 19 and the pipe 20 in series between the intake manifold 3 and the suction tank 7, so that any vapors which come through the pipe 19 would otherwise be discharged into the intake manifold 3 are condensed in said condenser 21 and are trapped in a suitable closed tank or trap 23 where they are retained until needed for starting the engine.

The suction chamber 18 is in reality a motor chamber, as it has a motor diaphragm 25 preferably in the shape of a metal flexible diaphragm, although a piston or any equivalent motor element may be employed instead. The motor chamber 18 has an inlet passageway 26 formed by a depending nipple having a valve seat at its lower end adapted to cooperate with the valve 27, which valve is applied to its seat by the float 28 when the pumping chamber 8 is substantially full, and which is then held to its seat by suction and by the float, until the motor element 25 is moved to open the dumping valve 29, as will be described later. This valve 27 is held upon the upper end of the stem 30, which stem has a stop 31 at its upper end and a low level stop 32 at its lower end. The stem 30 is guided in suitable brackets which may be secured either to the head and to the bottom of the compartment 8, or to the sides thereof as may be desired. Any suitable means for guiding this stem will serve. The motor diaphragm 25 is connected by a stem or rod 33 to a valve operating lever 34, which valve operating lever is pivoted at 35 and the forward end of which bears against the side of the spring pressed dumping valve 29. The valve 29 is held to its seat by the spring 36 with a force sufficient to secure a substantially tight seating. During the suction period this valve is also held to its seat by the pressure of the atmosphere, and being generous in size it is held to said seat with considerable force which must be overcome to dislodge the same for making the dumping or exhaust stroke. While I have shown a flap valve, it is to be understood that any suitable valve, preferably a lift valve, may be employed in this connection, care being had, however, to have the valve seat with the atmospheric pressure so that it remains tight during the suction stroke and requires considerable force to open the same for admitting atmosphere and dumping the liquid fuel from the chamber 8.

Within the motor chamber 18 I have provided the pipe 19 with a depending portion 37, which forms a valve seat. A suitable valve plug 38 is moved by the motor member 25 when the motor operates to close off or reduce the opening between the suction pipe 19 and the motor chamber 18. To this end I have provided a small orifice 40 in the side of the depending pipe 37, so that when the plug 38 closes off the end of the pipe a very considerable restriction between the suction pipe 19 and the motor chamber 18 exists. The purpose of this is to permit a relatively small control port 26, so that the control valve 27 may be small and readily pulled away from the valve seat 26 by the lowering of the float 28.

The operation of the tank is as follows:

Assuming that the parts are in the condition shown, and that suction is exerted upon the pipe 19. Fuel flows in through the fuel pipe 15 and strikes the spray device 39 which causes the incoming liquid fuel to be sprayed out to present a relatively large surface to the reduced pressure in the pumping chamber 8 so that volatile constituents may be drawn off. The air moves out of the chamber 8 carrying with it such vapors as are given off by the incoming fuel, the valve 29 at this time being closed and being held in said position by the applying spring 36 and by the effect of suction. The diaphragm 25 stands in neutral position because the pressures upon both sides of the diaphragm 25 are substantially the same. As the low part of the pumping chamber 8 fills with liquid fuel, the float 28 rises along the stem 30, and finally as the chamber is substantially full of liquid fuel the float 28 strikes the stop 31 and raises the stem 30 so that the valve 27 is applied to its seat 26 and is snapped against said seat by suction. Now, there is no further communication between the motor chamber 18 and the pumping chamber 8, and with the inflow of further fuel and with any leakage past the valve 36, the pressure in the chamber 8 rises whereas the pressure in the motor chamber 18 tends to drop, due to the full suction of the engine being exerted upon the upper side of the motor member 25, with the result that this unbalancing of pressures moves the motor member 25 upwardly, carrying with it the operating lever 34 for opening the valve 29. The initial movement of the lever 34 tends to crack the valve 29 off of its seat, and as this happens air rushes in still further unbalancing the pressures upon opposite sides of the diaphragm 25, causing it to rise with a sudden or snap action, completely opening the valve 29 and applying the plug valve 38 to the seat 37, thereby restricting the communication between the suction pipe 19 and the interior of the motor chamber 18. Now as the air bubbles up through the liquid in the pumping chamber 8 it becomes charged with vapors from the lighter constituents of the gasoline, and these vapors fill the chamber 8 and also flow down into the pipe 15 with the reflux of the liquid column which is dropped as soon as air moves into the same. If desired, a check valve may be placed in the pipe 15, but this is not necessary. Assuming that the check valve is not employed in the pipe 15, the falling of the column of liquid fuel back into the tank draws air and vapor into said pipe 15, bringing the same down to the point where the pipe 15 is warmed by the exhaust pipe 16. As the liquid fuel flows out of the dumping valve 29, the level in the chamber 8 drops down until the float 28 encounters the stop 32 and pulls the valve 27 away from the seat 26. It is to be noted that the bubbling of the air up through the liquid causes a violent oscillation of said float 28 with the result that it pounds against the stop 32 readily removing the valve 27 from its seat 26 where it has been held by the action of suction. As soon as the valve 27 starts to move from its seat 26, it drops rapidly and air at substantially atmospheric pressure rushes into the connection 26 and substantially reduces the suction in the motor chamber 18 with the result that the diaphragm 25 quickly moves down again opening the plug valve 38 and closing the dumping valve 29. If desired, a spring may be employed upon the upper side of the diaphragm 25 to assist in restoring the diaphragm 25 to its lowermost position. The area of the diaphragm 25 may be made large in order to secure adequate power for opening the valve 29 and for closing the valve 28.

It is understood that the lower chamber 9, which forms a reservoir, communicates with atmosphere through the opening 10, as it has the side walls of its upper portion spaced away from the walls of the chamber 8. When the level in the reservoir 9 rises to a point where further pumping of the fuel is not required, the float 28 does not drop to its lowermost position and consequently the parts stand with the valve 27 closed, the valve 29 open and the valve 38 closed. If suction fails in the meanwhile, the valve 27 may open unless the float 28 holds it to its seat, and the diaphragm 25 moves down opening the valve 38 and closing the valve 29, but as soon as suction is again exerted, sufficient fuel will be drawn into the pumping chamber 8 to raise the valve 27 to its seat, shut off the valve 38 and open the valve 29.

The angle bracket 39 is placed below the end of the fuel supply pipe 15 to cause the fuel to be sprayed out into the chamber so as to assist in exposing a relatively large surface to the action of the suction which carries off air and vapor through the opening 26 and out through the pipe 19.

If the liquid fuel is warmed when it enters the chamber or while it is in the chamber 8 vapors are more readily given off, but under ordinary circumstances such heating is not necessary. The drop in pressure alone is sufficient to take off the lighter ends, and if such drop in pressure alone is depended upon, the resulting distillate will be all the more volatile and hence better adapted for starting the engine. The vapors passing out the pipe 19 pass through the condenser 21, which, instead of being a coil, may be of any other suitable shape to expose a large surface to the cooling action of air or other cooling medium, and this condensate which consists of highly volatile constituents of the fuel runs by gravity into the trap 23 where it tends to remain until removed therefrom. The pipe 20 which communicates with the lower end of the condenser 21 for taking away the air out of the condenser 21, is preferably of a size large enough to supply sufficient flow of mixed fuel and air upon starting to start the engine 1. This pipe 20 connects into the side of the pipe 41 which leads the condensate by gravity into the trap 23.

For starting the engine, I provide an air pipe 42 which has therein a suitable valve 43 preferably closed by a spring and operable by a suitable manual control 44 to open said valve 43 for admitting air into the pipe 42. This pipe leads to substantially the bottom of the trap 23 and permits air to be bubbled through the condensate 23 to cause a suitable vaporized mixture to pass through the pipe 20 into the intake manifold 3 of the engine. The throttle valve 45 of the engine is closed so that a high suction is placed upon the pipe 20, resulting in a ready vaporization of the light constituent contained in the trap 23.

The fuel tank 7 is substantially ineffective at this time and, if desired, it may be rendered completely inefective by a suitable valve, such as is shown in Fig. 3. That is to say, instead of waiting for the fuel tank 7 to fill itself and become inoperative, I may use a three-way valve, as is shown at 46, for cutting the same off and for throwing the suction directly upon the starting carburetor which employs the trap 23'.

In the system shown in Fig. 3 the condenser 21 is cooled by a flow of water from the circulating pump 50 which draws water from the lower end of the radiator 51 and discharges the same to the water jacket of the engine, this cooling water maintaining a suitable condensing temperature in the condenser 21 for distilling out the desired light constituent. The three-way valve 46 is normally so connected that the condensate drops down into the trap 23 and the air passes out laterally to the pipe 20' to the intake manifold 3 of the engine. An atmospheric connection 52 is normally closed by the plug of the three-way valve. A pipe 53 of small diameter extends into the interior of the passageway 20' forming a nozzle therein. This pipe 53 extends to a point adjacent the bottom of the trap 23' for drawing liquid fuel therefrom. This pipe and its projecting nozzle form means for discharging some of the high test liquid into the air passageway 20' when the three-way valve 46 is set so that the plug is turned 90 degrees in a clockwise direction. When so turned, the air connection 52 communicates with the top of the trap 23 and with the interior of the pipe 20' cutting off completely the condenser 21 and the suction tank 7. The inner leg of the T forms sufficient restriction to permit the suction of the engine to raise fuel through the nozzle 53 and to discharge the same into the pipe 20'. Thus, the trap with its nozzle 53 and air connection 52 then becomes a spray type of carburetor for spraying a rich mixture of air and fuel into the intake manifold 3. The condensate from the condenser 21 or 21' may be discharged into the trap 23 or 23', as the case may be, and from there between intervals of suction it may drop to the usual float chamber of a special carburetor which is employed for starting only. In such case a check valve is interposed between the trap 23' and such float chamber to prevent reflux of the liquid fuel and to prevent the inflow of air.

In the form shown in Fig. 4 the air condenser 21 is supplemented by an additional condenser 53, which comprises a coil wrapped around the mixing chamber of the carburetor 4. As is well known to those skilled in the art, the mixing of the liquid fuel with the air taken into the carbureter, causes a drop in temperature of the mixture due to the necessity for supplying the latent heat of vaporization from the air or from the liquid or from the surrounding media. As a result, this portion of the carburetor usually is considerably colder than surrounding media. The condensate from the condenser 21 and the condenser 53 is discharged downwardly into the trap 23'', such downward discharge serving as a kinetic separator for the distillate and of the air. The air passes on over through the connection 20'' into the intake manifold of the engine. The bubbling pipe 42 for admitting air into the trap 23'' has the valve 43, as explained in connection with Fig. 1. The operation of this system, so far as starting the engine is concerned, is the same as described in connection with Fig. 1.

The opening of the valve 43 or 46 is controlled by a manual pull button 44 which is spring retracted so that as soon as the engine is started the operator lets go the button 44 and the system is thrown upon the regular fuel feeding system and the normal operation of the engine proceeds.

The fan shown in Fig. 1 provides a blast of air for cooling the condenser 21. A supply of cold air from outside the hood may obviously be substituted.

I do not intend to be limited to the details shown or described except as the same appear in the appended claims.

I believe I am broadly the first to provide a high test starting fuel which is generated automatically by the running of the engine. I believe that I am also the first to take volatile constituents from the main supply tank or from the vacuum tank, as the case may be, and condense the same for starting purposes at some future time.

I claim:—

1. The method of preparing a starting fuel for a gasoline engine which comprises progressively subjecting the fuel which is normally fed to the engine to the suction of the engine to cause the same to give off vapors of the lighter constituents thereof, and condensing said vapors in a separate chamber and feeding said lighter fuel to the engine when the engine is cold.

2. The method of preparing a starting fuel for a gasoline engine which comprises separating from the fuel which is supplied to the engine the lighter constituents of the fuel by the suction of the engine and storing said lighter constituents for starting the engine and feeding said lighter constituents to the engine when the engine is cold.

3. In combination with the intake pipe of an engine, a carburetor, a vacuum fuel feed tank for raising gasoline and supplying the same by gravity to the carburetor, a suction connection between the intake pipe and the tank, and a condenser in said connection.

4. In combination, an internal combustion engine intake pipe, a vacuum feed tank, a suction connection between the pipe and the tank, a condenser in said connection, and means for cooling said condenser.

5. In combination, an internal combustion engine having an intake pipe, a vacuum feed tank, a suction connection between the pipe and the tank, a condenser in said connection, means for cooling the condenser, and a closed trap for receiving the condensate from said condenser.

6. In combination, an internal combustion engine having an intake pipe, a vacuum feed tank, a suction connection between the pipe and the tank, a condenser in said connection, means for cooling the condenser, and a closed trap for receiving the condensate from said condenser, and means for discharging a mixture of air and said condensate into the intake pipe of the engine upon starting the engine.

7. In combination, an internal combustion engine having an intake pipe, means for subjecting a quantity of liquid fuel for the engine to the suction of the intake pipe, a condenser for condensing the vapors drawn off, and means for discharging the condensate into said intake manifold for starting the engine.

8. The method of preparing a starting charge of fuel for a gasoline engine of the suction type which comprises progressively subjecting the fuel which is normally fed to the engine to the suction of the engine to cause the same to give off vapors of the lighter constituents thereof and condensing said vapors in a separate chamber available for starting the engine.

9. The method of operating a gasoline engine of the aspirating type which comprises subjecting the liquid fuel for the engine to heat and the suction of the engine to evolve vapors of the lighter constituents of the liquid fuel, feeding the residue of the liquid fuel to the engine by aspiration, condensing said vapors separately from the residue to form a light fuel, and feeding said light fuel to the engine when the engine is cold.

10. In the operation of a gasoline engine of the aspirating type, the method of feeding the same with fuel which comprises raising the gasoline to the engine from a lower level by the suction of the engine, and simultaneously by the aid of said suction distilling off the lighter fuel ends from the gasoline to form a starting fuel for the engine when the same is cold.

11. In combination with an internal combustion engine having an intake pipe with a throttle valve therein, a fuel supply tank, a vacuum tank having a liquid draft pipe running to the fuel supply tank, and a suction conduit extending to the intake pipe above the throttle, a condenser in said conduit and a storage receptacle communicating with said condenser and adapted to receive the condensate drained by gravity from said condenser and means for introducing said condensate and air into said intake pipe above the throttle for starting the engine.

12. The method of preparing a starting fuel for a gasoline engine which comprises, progressively raising batches of liquid fuel, feeding the fuel to the carburetor of the engine, and, prior to the feeding of the fuel to the carburetor, subjecting said batches individually to the suction of the engine to cause them to give off vapors of the lighter constituents thereof, condensing said vapors and trapping the condensate for the next starting operation of the engine.

13. The method of preparing a starting fuel for a gasoline engine which comprises, fractionating the fuel on its way to the carburetor by simultaneously subjecting it to the heat and suction of the engine, and collecting the lighter fractions for starting purposes, then feeding the lighter fractions to the engine when the same is cold.

In witness whereof, I hereunto subscribe my name this 6th day of October, 1923.

JOHN A. DIENNER.